(12) United States Patent
Masushio et al.

(10) Patent No.: US 9,614,679 B2
(45) Date of Patent: *Apr. 4, 2017

(54) INFORMATION PROCESSING APPARATUS, INFORMATION PROCESSING METHOD, INFORMATION PROCESSING PROGRAM AND INFORMATION PROCESSING SYSTEM

(71) Applicant: FeliCa Networks, Inc., Tokyo (JP)

(72) Inventors: Tomohiro Masushio, Tokyo (JP); Naoto Tobita, Tokyo (JP); Hiroaki Yamada, Tokyo (JP)

(73) Assignee: Felica Networks, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/863,783

(22) Filed: Apr. 16, 2013

(65) Prior Publication Data

US 2013/0227298 A1 Aug. 29, 2013

Related U.S. Application Data

(63) Continuation of application No. 12/543,084, filed on Aug. 18, 2009, now Pat. No. 8,438,398.

(30) Foreign Application Priority Data

Aug. 20, 2008 (JP) .................................. 2008-212150

(51) Int. Cl.
H04L 29/06 (2006.01)
H04L 9/32 (2006.01)

(52) U.S. Cl.
CPC ........ H04L 9/3247 (2013.01); H04L 63/0853 (2013.01); H04L 63/0823 (2013.01)

(58) Field of Classification Search
CPC ... H04L 63/04; H04L 63/083; H04L 63/0853; H04L 63/105; H04L 9/3294;
(Continued)

(56) References Cited

U.S. PATENT DOCUMENTS 4,839,504 A * 6/1989 Nakano .......................... 235/379
7,337,976 B2 * 3/2008 Kawamura et al. .......... 235/492
(Continued)

FOREIGN PATENT DOCUMENTS

JP 08-328470 12/1996
JP 2003-208410 7/2003
(Continued)

OTHER PUBLICATIONS

Japanese Office Action issued Jun. 22, 2010 for corresponding Japanese Appln. No. 2008-212150.

*Primary Examiner* — Carl Colin
*Assistant Examiner* — Ghodrat Jamshidi
(74) *Attorney, Agent, or Firm* — K&L Gates LLP

(57) ABSTRACT

An information processing apparatus according to the present application includes a first application allowed to access the IC chip, including an IC chip in which predetermined data is recorded, an IC chip reading unit that reads the data recorded in the IC chip, and a signature data generation unit that generates signature data by performing encryption processing on the recorded data read by the IC chip reading unit and a second application not allowed to access the IC chip, including a server access unit that requests acquisition of content from an information providing server by receiving the signature data and the recorded data from the first application and transmitting the signature data and the recorded data to the information providing server that provides predetermined content.

12 Claims, 11 Drawing Sheets

(58) Field of Classification Search
CPC ..... H04L 9/3281; H04L 9/32; H04L 63/0823; H04L 9/3247; G06F 21/00; G06F 21/6218; G06F 12/14; G06F 12/08; H04N 2201/3233
See application file for complete search history.

(56) References Cited

U.S. PATENT DOCUMENTS

| | | | |
|---|---|---|---|
| 7,900,054 B2* | 3/2011 | Brizek | 713/189 |
| 2004/0044576 A1* | 3/2004 | Kurihara et al. | 705/14 |
| 2004/0258274 A1* | 12/2004 | Brundage et al. | 382/100 |
| 2005/0114619 A1* | 5/2005 | Matsuo et al. | 711/170 |
| 2006/0224512 A1* | 10/2006 | Kurakata | G06Q 10/00 705/50 |
| 2008/0283595 A1* | 11/2008 | Kimura et al. | 235/380 |

FOREIGN PATENT DOCUMENTS

| | | |
|---|---|---|
| JP | 200677487 | 3/2006 |
| JP | 2008-027381 | 2/2008 |

* cited by examiner

FIG.3

| USER ID | CURRENT TIME |
|---------|--------------|
| A000284 | 2008-05-02 12:10 |
| A330213 | 2008-06-26 9:36 |
| F938812 | 2008-06-26 14:18 |
| ⋮ | ⋮ |

218

INFORMATION PROCESSING APPARATUS, INFORMATION PROCESSING METHOD, INFORMATION PROCESSING PROGRAM AND INFORMATION PROCESSING SYSTEM

CROSS REFERENCES TO RELATED APPLICATIONS

The present application is a continuation of U.S. application Ser. No. 12/543,084 filed on Aug. 18, 2009, which claims priority to Japanese Patent Application JP 2008-212150 filed in the Japan Patent Office on Aug. 20, 2008, the entire contents of which being incorporated herein by reference.

BACKGROUND

The present application relates to an information processing apparatus, an information processing method, an information processing program, and an information processing system.

In recent years, information processing terminals such as mobile phones on which a non-contact ID (Integrated Circuit) card or IC chip is mounted have become widely available. User IDs and the like are recorded in such IC chips. Moreover, applications that can access an IC chip can be mounted on such information processing terminals. Such applications read recorded data such a user ID recorded in an IC chip, which can be used as authentication information when accessing an information providing server and the like providing various kinds of content. Accordingly, the information providing server can provide only content data corresponding to the user ID transmitted from an information processing terminal to the information processing apparatus.

Various technologies have been used to prevent unauthorized illegal access by third parties in transmission/reception of data. For example, Japanese Patent Application Laid-Open No. 2006-77487 discloses a technology to verify authenticity of access in which user signature information in which information such as the user access time is encoded is transmitted to a server apparatus and the server apparatus decodes the received user signature information.

[Patent Document 1] Japanese Patent Application Laid-Open No. 2006-77487

SUMMARY

However, resources (such as the capacity of an application itself, that of data, and that of files) available to an application that is allowed to access an IC chip are generally limited by communication carriers or the like. Therefore, information processing terminals generally use a browser, which is a different application from an application that is allowed to access an IC chip, to access Web content provided by an information providing server to acquire desired content.

However, data recorded in an IC chip can be accessed only by specific applications approved by specific service operators or communication carriers. Therefore, browsers universally provided in information processing terminals such as mobile phones are not allowed to access an IC chip in which information such as the user ID is recorded. That is, when accessing an information providing server from a browser, the user ID recorded in an IC chip may not be used for access authentication. Thus, there is an issue that it is necessary for the user to enter, for example, the ID and password or information such as a subscriber ID provided by a communication carrier again. Further, there is an issue for the information providing server that it is necessary to manage, in addition to the user ID recorded in an IC chip, the ID and password or subscriber ID to authenticate access from the browser.

Thus, the present application has been made in view of the above issues and it is desirable to provide a novel and improved information processing apparatus that eliminates the need for a troublesome operation of entering authentication information such as an ID and password when accessing content using an application that is not allowed to directly access an IC chip, an information processing method, an information processing program, and an information processing system.

According to an embodiment of the present application, there is provided an information processing apparatus, including: an IC chip in which predetermined data is recorded; a first application allowed to access the IC chip, including: an IC chip reading unit that reads the data recorded in the IC chip; a signature data generation unit that generates signature data by performing encryption processing on the recorded data read by the IC chip reading unit; and a second application not allowed to access the IC chip, including a server access unit that requests acquisition of content from an information providing server by receiving the signature data and the recorded data read by the IC chip reading unit from the first application and transmitting the signature data and the recorded data to the information providing server that provides the predetermined content.

According to the above configuration, a first application allowed to access an IC chip can read predetermined recorded data recorded in the IC chip. The first application can also generate signature data by performing encryption processing on the recorded data read from the IC chip. A second application not allowed to access the IC chip can receive the signature data and the data recorded in the IC chip from the first application. Further, the second application transmits the signature data and the recorded data received from the first application to an information providing server to request acquisition of predetermined content.

A user ID specific to the IC chip may be recorded in the IC chip and the IC chip reading unit may read the user ID from the IC chip.

The information processing apparatus may further include a time counter that stores a current time, and the first application may further include a current time reading unit that reads the current time recorded in the time counter. In this case, the signature data generation unit may generate signature data by performing encryption processing on the user ID read by the IC chip reading unit and the current time read by the current time reading unit.

The information processing apparatus may further include an encryption key common to the information providing server. In this case, the signature data generation unit may generate signature data by performing encryption processing on the user ID read by the IC chip reading unit and the current time read by the current time reading unit using the encryption key.

The first application may further include an activation control unit that activates the second application by transferring the user ID read by the IC chip reading unit, the current time read by the current time reading unit, and the signature data generated by the signature data generation unit to the second application.

When the server access unit requests the acquisition of the content from the information providing server that provides predetermined content, the server access unit may further transfer the current time transferred from the activation control unit to the information providing server, in addition to the signature data and the user ID.

According to another embodiment of the present application, there is provided an information processing method including the steps of: reading data recorded in an IC chip by an IC chip reading unit of a first application allowed to access the IC chip in which predetermined data is recorded; generating signature data by performing encryption processing on the recorded data read in the IC chip reading step by a signature data generation unit of the first application; transferring the signature data generated in the signature data generation step and the recorded data read in the IC chip reading step to the second application not allowed to access the IC chip; and requesting acquisition of content from an information providing server by transmitting the signature data and the recorded data transferred in the signature data transfer step to the information providing server that provides predetermined content by a server access unit of the second application.

According to another embodiment of the present application, there is provided an information processing program causing a computer to perform: IC chip reading processing to read data recorded in an IC chip by an IC chip reading unit of a first application allowed to access the IC chip in which predetermined data is recorded; signature data generation processing to generate signature data by performing encryption processing on the recorded data read by the IC chip reading processing by a signature data generation unit of the first application; signature data transfer processing to transfer the signature data generated by the signature data generation processing and the recorded data read by the IC chip reading processing to the second application not allowed to access the IC chip; and content request processing to request acquisition of content from an information providing server by transmitting the signature data and the recorded data transferred by the signature data transfer processing to the information providing server that provides predetermined content by a server access unit of the second application.

According to another embodiment of the present application, there is provided an information processing system, including: an information processing apparatus, including: an IC chip in which predetermined data is recorded, a first application allowed to access the IC chip, including: an IC chip reading unit that reads the data recorded in the IC chip; and a signature data generation unit that generates signature data by performing encryption processing on the recorded data read by the IC chip reading unit; and a second application not allowed to access the IC chip, including a server access unit that receives the signature data and the recorded data read by the IC chip reading unit from the first application and transmits the signature data and the recorded data to the information providing server when the server access unit requests the acquisition of the content from the information providing server that provides predetermined content; and an information providing server, including: an authentication processing unit that determines whether the request of the acquisition of the content from the second application is authorized based on the signature data and recorded data transmitted from the second application, wherein if the request of the acquisition of the content from the second application is determined to be authorized, the content requested by the second application is transmitted to the second application.

According to the embodiments of the present application described above, the need for a troublesome operation of entering authentication information such as an ID and password when acquiring content using an application that is not allowed to directly access an IC chip can be eliminated.

Additional features and advantages are described herein, and will be apparent from the following Detailed Description and the figures.

BRIEF DESCRIPTION OF THE FIGURES

FIG. 3 is an explanatory view exemplifying an access history table 218 managed by an access history management unit 204 in the present embodiment;

DETAILED DESCRIPTION

Figure 1:
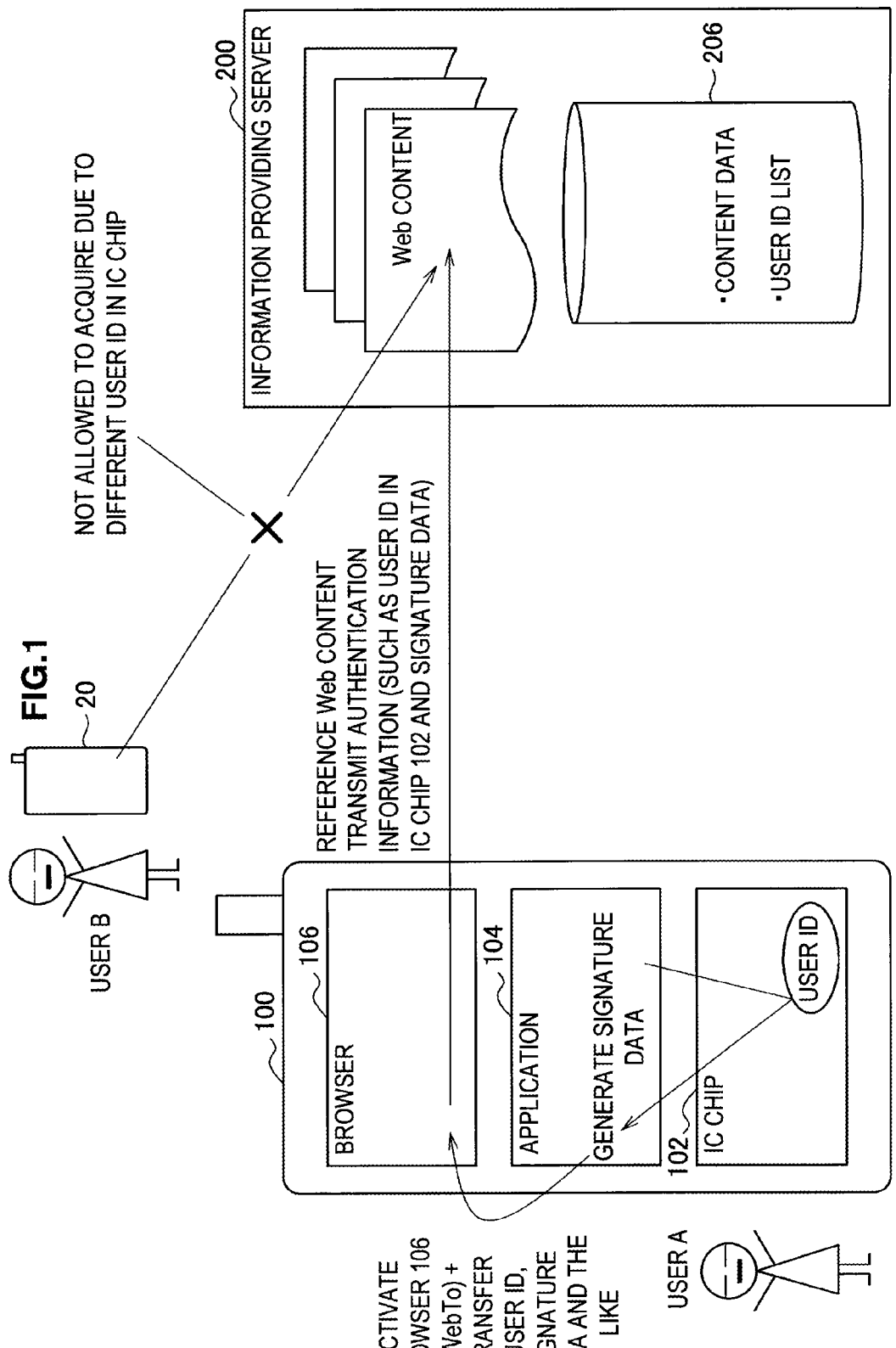
FIG. 1 is an explanatory view showing a concept that a browser 106 not allowed to access an IC chip 102 in a mobile phone 100 according to the present embodiment acquires predetermined Web content whose release is restricted using a WebTo function from an information providing server 200.

The present application will be described in detail with reference to the appended drawings according to an embodiment. Note that, in this specification and the appended drawings, structural elements that have substantially the same function and structure are denoted with the same reference numerals, and repeated explanation of these structural elements is omitted. The explanation will be made in the order shown below:

1. Overview of an embodiment (comparison with a content acquisition method in related art)
2. Configuration of the information processing system
2-1. Function configuration of the mobile phone 100
2-2. Function configuration of the information providing server 200
3. Flow of access processing by the mobile phone 100
4. Flow of access authentication processing by the information providing server 200
5. Hardware configuration of the mobile phone 100

(1. Overview of an Embodiment)

First, an access method to content by a conventional information processing apparatus will be described and then, an overview of the access method to content by the information processing apparatus according to an embodiment will be provided. In a description that follows, a mobile phone is taken as an example of the information processing apparatus.

Figure 11:
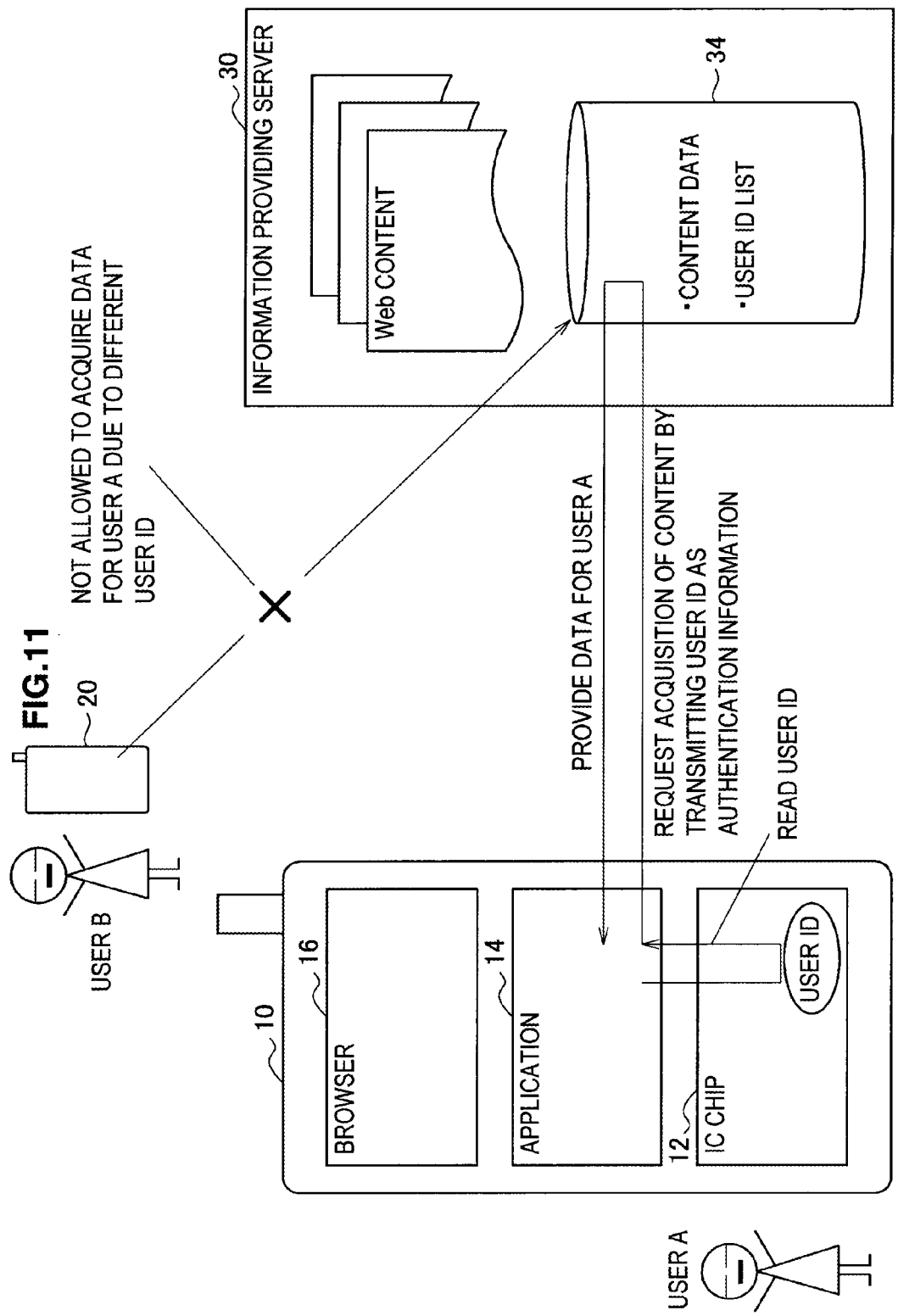
FIG. 11 is an explanatory view showing the concept of various kinds of content of an information providing server 30 being acquired by a mobile phone 10 in related art using a user ID recorded in an IC chip.

FIG. 11 is an explanatory view showing the concept of various kinds of content of the information providing server 30 being acquired by the mobile phone 10 in related art using an application allowed to access an IC chip. As shown in FIG. 11, the mobile phone 10 includes an IC chip 12, an application 14, and a browser 16. A user ID to be a user-specific ID is recorded in the IC chip 12. The application 14 is allowed to access the IC chip 12 and can read the user ID recorded in the chip 12.

A user A who uses the mobile phone 10 can acquire predetermined content data recorded in a content data storing unit 34 of the information providing server 30 by, for example, activating the application 14 of the mobile phone 10. In this case, in accordance with instructions from the user, the application 14 reads the user ID recorded in the IC chip 12 and transmits the user ID to the information providing server 30 together with an acquisition request of content data. After receiving the user ID, the information providing server 30 authenticates the acquisition request of content data from the mobile phone 10 based on a user ID list recorded in the content data storing unit 34 and transmits content data to the mobile phone 10. Thus, the application 14 can transmit a user ID, which is information specific to the mobile phone 10, to the information providing server 30 after reading the user ID from the IC chip 12. Therefore, the information providing server 30 can transmit content data desired by the user A, who is a user of the mobile phone 10, to the mobile phone 10 by performing authentication based on a user ID and user ID list transmitted from the mobile phone 10.

Here, another mobile phone 20, which is different from the mobile phone 10, has an IC chip in which a different user ID is recorded. Therefore, for example, even if a user B whose uses the mobile phone 20 attempts to illegally acquire content restricted to the user A from the information providing server 30, the information providing server 30 can reject a content acquisition request from the user B because the user ID is different.

In this manner, the application 14 that is allowed to directly access the IC chip 12 transmits a user ID, which is secure information recorded in the IC chip 12, to the information providing server 30 as authentication information to request/acquire predetermined content. The information providing server 30 can also authenticate access from the application 14 easily by managing a list corresponding to user IDs of the IC chip 12.

However, resources (such as the capacity of the application 14 itself, that of data, and that of files) available to the application 14 that is allowed to access the IC chip 12 are generally limited by communication carriers or the like. Therefore, the mobile phone 10 generally uses the browser 16, which is a different application from the application 14 that is allowed to access the IC chip 12, to access Web content provided by the information providing server 30 to acquire desired content.

The method of accessing predetermined Web content by activating the browser 16 of the application 14 in this manner is called a WebTo function or the like. By using the WebTo function, the mobile phone 10 can acquire predetermined Web content using the browser 16, instead of the application 14 whose available resources are limited.

Figure 12:
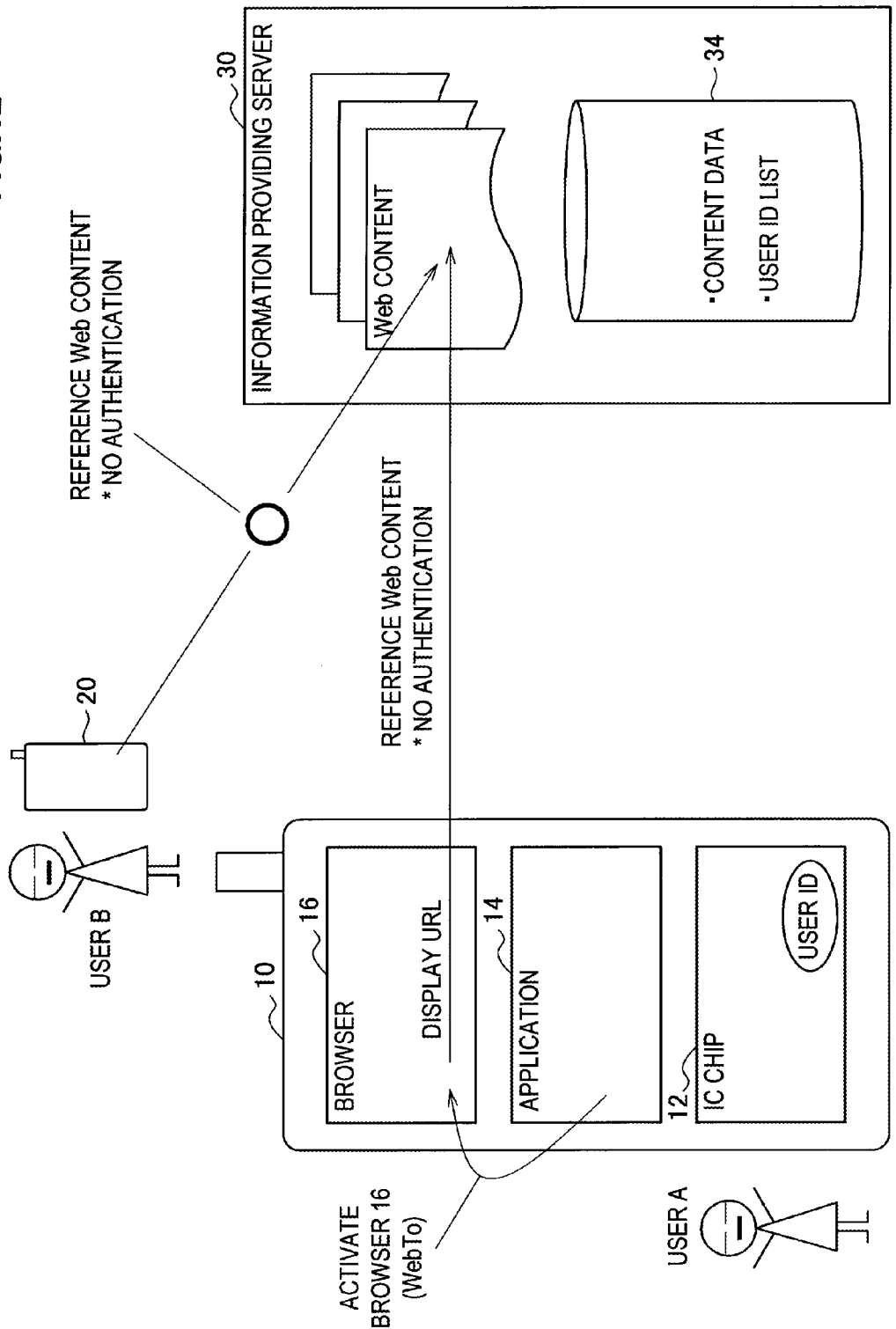
FIG. 12 is an explanatory view showing the concept that a browser 16 not allowed to access an IC chip in a conventional mobile phone 10 acquires predetermined Web content generally made available using the WebTo function from the information providing server 30.

FIG. 12 is an explanatory view showing the concept that the browser 16 not allowed to access the IC chip 12 in the mobile phone 10 in related art acquires predetermined Web content generally made available using the WebTo function from the information providing server 30. Here, the browser 16 is a Web page perusing browser capable of acquiring Web content from the information providing server 30 to have the content displayed in a screen. The browser 16 can have Web content displayed in the screen by reading the Web content transmitted from the information providing server 30.

As shown in FIG. 12, for example, in accordance with instructions from the user, the application 14 activates the browser 16 and transfers a URL corresponding to predetermined Web content generally made available to the browser 16. After receiving the URL, the browser 16 has the URL displayed in the screen. If the user selects the URL displayed in the screen, the browser 16 accesses Web content provided by the information providing server 30. The browser 16 has the acquired Web content displayed in the screen.

When Web content generally made available is provided, there is no need for the information providing server 30 to authenticate access from the mobile phone 10. Therefore, Web content generally made available can be provided to access from any mobile phone. In the example shown in FIG. 12, Web content generally made available can be provided to both the mobile phone 10 used by the user A and the mobile phone 20 used by the user B in response to a request of the browser of each mobile phone. As content generally made available, for example, FAQ (Frequently Asked Questions) and service explanations can be assumed.

On the other hand, content provided by the information providing server 30 may contain content provided only to specific users. In this case, the information providing server 30 needs to authenticate whether content may be provided to a request from the browser 16. Therefore, it is necessary for the mobile phone 10 to transmit some kind of authentication information when acquisition of Web content is requested from the information providing server 30.

Figure 13:
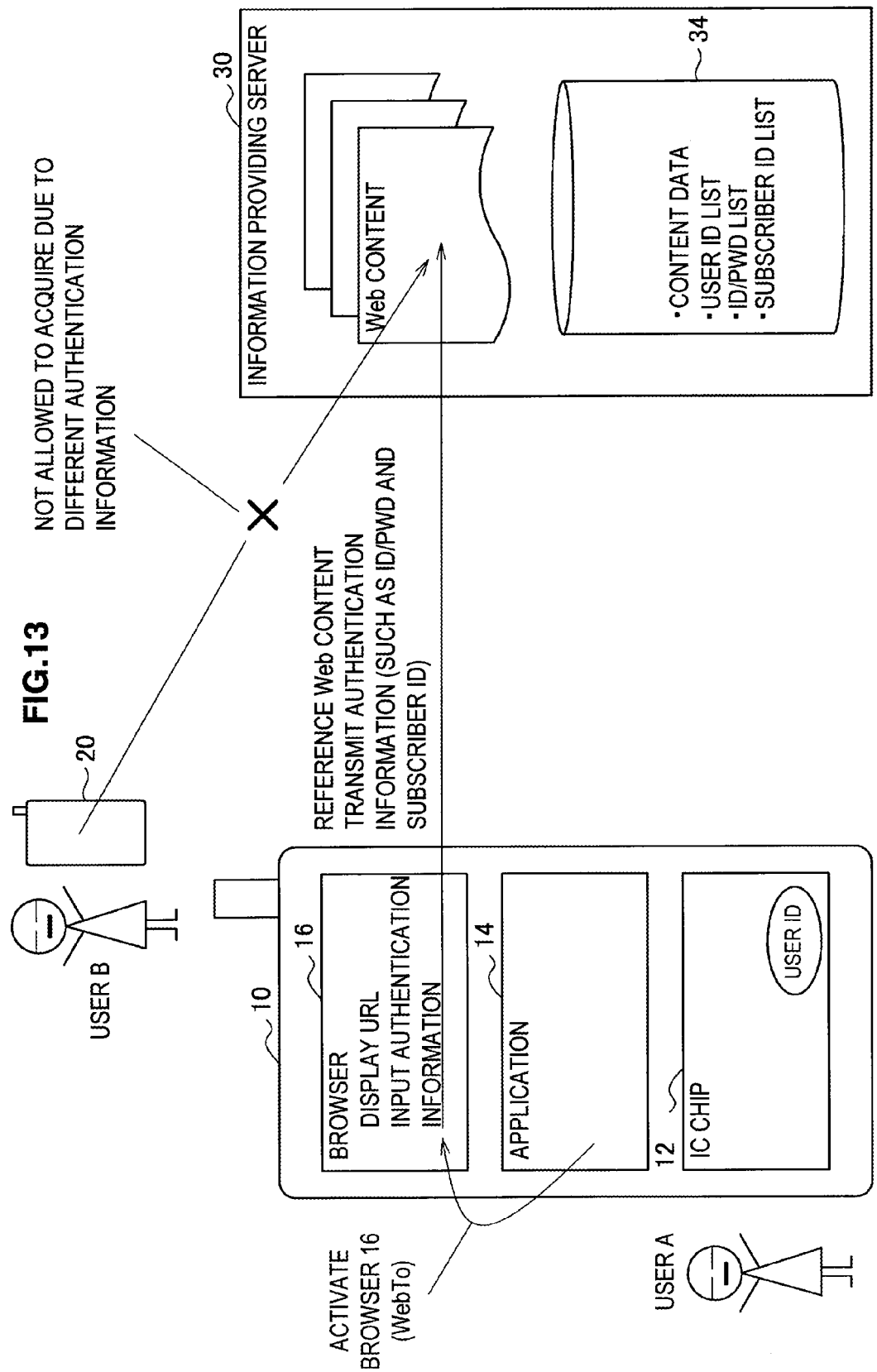
FIG. 13 is an explanatory view showing the concept that the browser 16 not allowed to access the IC chip in the mobile phone 10 in related art acquires predetermined Web content whose release is restricted using the WebTo function from the information providing server 30.

FIG. 13 is an explanatory view showing the concept that the browser 16 not allowed to access the IC chip 12 acquires predetermined Web content whose release is restricted using the WebTo function from the information providing server 30.

As shown in FIG. 13, for example, in accordance with instructions from the user, the application 14 activates the browser 16 and transfers a URL corresponding to predetermined Web content whose release is restricted to the browser 16. After receiving the URL, the browser 16 has the URL displayed in the screen. If the user selects the URL displayed in the screen, the browser 16 accesses Web content provided by the information providing server 30. At this point, the information providing server 30 requests information input from the mobile phone 10 to authenticate access from the mobile phone 10. After receiving the request, the browser 16 has a screen displayed for the user to enter authentication information.

As authentication information to be entered by the user, an ID, password, and predetermined subscriber ID provided by communication carriers can be assumed. The browser 16 transmits authentication information entered by the user to the information providing server 30. After receiving the authentication information, the information providing server 30 determines whether the access request is valid based on, for example, a list of IDs or passwords or a list of subscriber IDs of communication carriers. Only when the authentication information transmitted from the browser 16 is valid, the information providing server 30 transmits Web content to the mobile phone 10. Accordingly, the browser 16 can acquire Web content whose release is restricted to have the Web content displayed in the screen.

Thus, when providing Web content whose release is restricted, the information providing server 30 can authenticate access from the mobile phone 10 by comparing authentication information transmitted from the mobile phone 10 and a list concerning the authentication information. That is, the information providing server 30 can provide Web content whose release is restricted only to users permitted to access the Web content. In the example shown in FIG. 13, if the user B requests acquisition of Web content only the user A is allowed to access by using the mobile phone 20, the information providing server 30 can reject access from the mobile phone 20 based on authentication information transmitted from the mobile phone 20.

However, in order to use the access restriction method described above, it is necessary for the user to perform a troublesome operation of entering authentication information such as an ID and password each time predetermined Web content is accessed from the browser 16. It is also necessary for the information providing server 30 to manage a list of IDs or passwords as a database to determine authenticity of authentication information transmitted from the browser 16. Moreover, subscriber IDs provided by communication carriers, for example, are appropriately updated or changed due to cancellation of contracts of mobile phones. Therefore, it has been necessary for the information providing server 30 to update a database of the subscriber ID list frequently to deal with subscriber IDs frequently updated and changed. Further, specifications of subscriber IDs may be different depending on communication carriers. Therefore, the information providing server 30 has to have an authentication means of different specifications for each communication carrier.

An access method to content by the mobile phone 100 and the information providing server 200 according to an embodiment serves to solve the above issues in related art.

FIG. 1 is an explanatory view showing the concept that the browser 106 not allowed to access the IC chip 102 in the mobile phone 100 according to the present embodiment acquires predetermined Web content whose release is restricted using the WebTo function from the information providing server 200.

As shown in FIG. 1, for example, in accordance with instructions from the user, an application 104 reads the user ID recorded in the IC chip 102. The application 104 also reads the current time from a time counter (not shown) provide with the mobile phone 100. Further, the application 104 performs encryption processing on the user ID and current time using a signature key, which is an encryption key common to the information providing server 200, to generate signature data. Then, the application 104 activates the browser 106 to transfer the user ID read from the IC chip 102, current time read from the time counter, signature data generated using the signature key, and URL corresponding to predetermined Web content to the browser 106. After reception thereof, the browser 106 has the URL received from the application 104 displayed in the screen.

If the user selects the URL displayed in the screen, the browser 106 accesses the Web content provided by the information providing server 200. At this point, the browser 106 transmits the user ID, current time, and signature data received from the application 104 to the information providing server 200 as authentication information.

The information providing server 200 performs authentication processing of access from the browser 106 based on the user ID, current time, and signature data transmitted from the browse 106. The information providing server 200 has a signature key, which is an encryption key common to the mobile phone 100. Therefore, the information providing server 200 performs encryption processing on the user ID and current time transmitted from the browser 106 using the signature key to generate signature data. The information providing server 200 determines whether the generated signature data and the signature data transmitted from the browser 106 match. The information providing server 200 also determines whether or not the access is illegal access based on an access history in the past of the user ID. The information providing server 200 also determines whether a predetermined term of validity has passed based on information of the current time transmitted from the browser 106.

Thus, the information providing server 200 can receive the user ID, current time, and signature data from the browser 106 as authentication information. That is, received authentication information does not contain, like the method in related art described above, an ID other than the user ID recorded in the IC chip 102, password, or subscriber information of communication carriers. Therefore, there is no need for the information providing server 200 to manage a list of different IDs from user IDs, passwords, or subscriber information of communication carriers. Also for the user, there is no need to perform a troublesome operation of entering an ID, password, or subscriber information of communication carriers when accessing predetermined Web content whose release restricted using the browser 106.

Moreover, since secure information recorded in the IC chip 102 provided with the mobile phone 100 is used as authentication information, illegal access by third parties can be prevented. Authentication information transmitted from the mobile phone 100 used by the user A contains information of user-specific ID recorded in the IC chip 102 of the mobile phone 100. The user ID recorded in the IC chip of the mobile phone 20 used by the user B is different from that recorded in the mobile phone 100 of the user A. Therefore, even if the user B attempts to illegally acquire content to be provided to the user A using the mobile phone 20 from the information providing server 200, the information providing server 200 can reject access from the mobile phone 20 because the user ID is different.

Thus, in the mobile phone 100 according to an embodiment, when predetermined Web content is acquired using the browser 106, the application 104 allowed to directly access the IC chip 102 reads the user ID recorded in the IC chip 102. Then, the application 104 generates signature data for information containing the user ID using a signature key common to the information providing server 200 and transfers the signature data to the browser 106. After receiving the signature data, the browser 106 can transmit, in addition to an acquisition request of Web content, information containing the user ID recorded in the IC chip 102 and signature data to the information providing server 200 as authentication information. That is, while it is difficult for the browser 106 to directly access the IC chip 102, the browser 106 can acquire information recorded in the IC chip 102 via the application 104 to transmit the information to the information providing server 200 as authentication information.

On the other hand, since authentication information transmitted from the browser 106 is information containing the user ID recorded in the IC chip 102, there is no need for the information providing server 200 to manage a list of IDs other than user IDs or passwords.

That is, the mobile phone 100 according to the present embodiment eliminates the need for a troublesome operation of entering authentication information such as ID and password even if Web content is accessed using the browser 106 that is not allowed to directly access the IC chip 102. Hereinafter, details of an information providing system having the above features and including the mobile phone 100 and the information providing server 200 will be described.

(2. Configuration of the Information Processing System)

Figure 2:
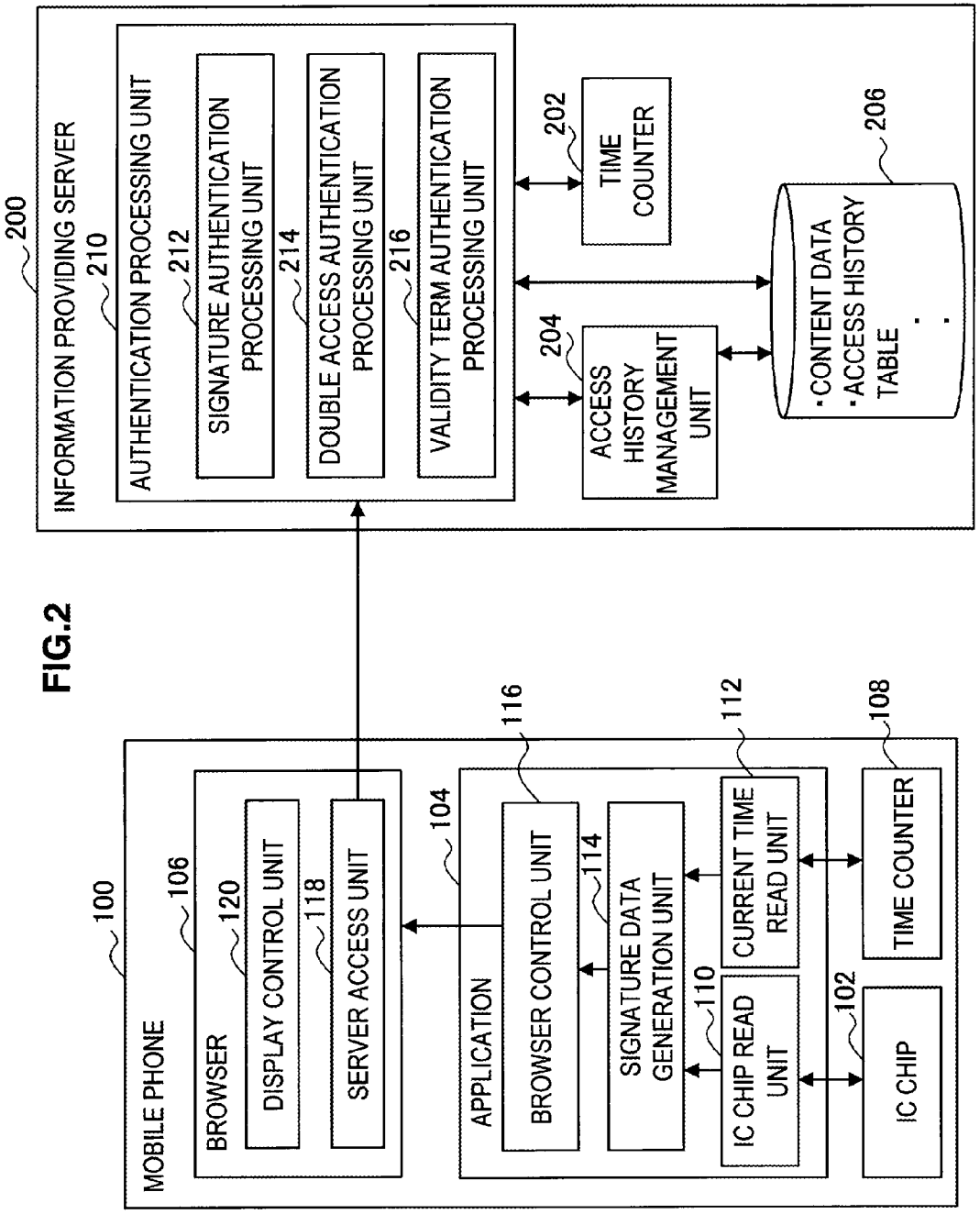
FIG. 2 is a block diagram showing the concept of an information providing system including the mobile phone 100 and the information providing server 200 according to the present embodiment.

First, the configuration of an information providing system including the mobile phone 100 and the information providing server 200 according to the present embodiment will be described. FIG. 2 is a block diagram showing the concept of an information providing system including the mobile phone 100 and the information providing server 200 according to the present embodiment. In FIG. 2, only one mobile phone 100 and one information providing server 200 are shown for convenience of description, but a plurality of the mobile phones 100 can actually access the information providing server 200. A detailed function configuration of the mobile phone 100 and the information providing server 200 will be described below.

(2-1. Function Configuration of the Mobile Phone 100)

As shown in FIG. 2, the mobile phone 100 mainly includes the IC chip 102, the application 104, the browser 106, and a time counter 108.

The IC chip 102 is, for example, a secure memory communicable with a reader writer (not shown) in a non-contact manner using electromagnetic waves and having tamper resistance. The IC chip 102 has data containing the user ID specific to the IC chip 102 securely recorded therein. The application 104 of the mobile phone 100 according to the present embodiment reads the user ID recorded in the IC chip 102, which is used as authentication information when the browser 106 accesses Web content. Therefore, in the present embodiment, as long as a specific user ID is recorded in the IC chip 102, the IC chip 102 is not limited to a specific communication method or processing performance.

Since secure information including the user ID is recorded in the IC chip 102, only specific applications are allowed to access. An application allowed to access the IC chip 102 is a program capable of decoding secure information recorded in the IC chip 102 or writing by encoding information. In the present embodiment, only the application 104 is allowed to directly access the IC chip and the browser 106 provided with the mobile phone 100 for wide use is not allowed to directly access the IC chip 102.

The time counter 108 stores the current time. The time counter 108 can, for example, adjust the current time in accordance with a user's operation or automatically collect the current time at intervals of a predetermined time. For example, a display unit (not shown) can be caused to display the current time stored in the time counter 108. The application 104 described later can read the current time from the time counter 108.

The application 104 is an application allowed to directly access the IC chip 102. As shown in FIG. 2, the application 104 mainly includes an IC chip reading unit 110, a current time reading unit 112, a signature data generation unit 114, and a browser control unit 116. In the present application, the application 104 functions as a first application allowed to access the IC chip 102.

The IC chip reading unit 110 can read recorded data containing the user ID recorded in the IC chip 102. If, for example, the user requests acquisition of Web content via the browser 106 from an operation unit, the IC chip reading unit 110 can read the user ID recorded in the IC chip 102. The user IC read from the IC chip 102 in this manner is used by the signature data generation unit 114 for generation of signature data before being transferred to the browser 106. Accordingly, the browser 106 can transmit the user ID to the information providing server 200 as authentication information when Web content is acquired from the information providing server 200.

The current time reading unit 112 can read the current time stored in the time counter 108. If, for example, the user requests acquisition of Web content via the browser 106 from the operation unit, the current time reading unit 112 reads the current time stored in the time counter 108. The current time read from the time counter 108 in this manner is used by the signature data generation unit 114 for generation of signature data before being transferred to the browser 106. Accordingly, the browser 106 can transmit the current time to the information providing server 200 as authentication information when Web content is acquired from the information providing server 200.

The signature data generation unit 114 generates signature data for the user ID read by the IC chip reading unit 110 and the current time read by the current time reading unit 112 using a predetermined encryption key. As described above, the mobile phone 100 and the information providing server 200 have a signature key as a common encryption key. Therefore, the signature data generation unit 114 performs encryption processing on the user ID and current time to generate signature data. The signature data generated in this manner is transferred to the browser 106 together with information of the user ID and current time. Accordingly, the browser 106 can transmit the signature data to the information providing server 200 as authentication information when Web content is acquired from the information providing server 200.

The browser control unit 116 controls the browser 106 in such a way that predetermined Web content is acquired from the information providing server 200. If, for example, the user requests acquisition of Web content via the browser 106 from the operation unit, the browser control unit 116 activates the browser 106. Further, the browser control unit 116 transfers the above user ID, current time, and signature data to the browser 106, in addition to the URL corresponding to the user specified Web content. Accordingly, the browser 106 can have the transferred URL displayed in the display unit (not shown). If the user selects the URL, the browser 106 can transfer the user ID, current time, and signature data as authentication information to the information providing server 200 when acquisition of Web content corresponding to the URL is requested.

Incidentally, the application 104 not only acquires Web content from the information providing server 200 by activating the browser 106, but also can naturally access the information providing server 200 by itself to acquire the predetermined content. However, resources (such as the capacity of the application itself, that of data, and that of files) available to the application 104 allowed to directly access the IC chip 102 are normally restricted by communication carriers. Therefore, it is difficult for the application 104 to acquire rich content. As a result, to acquire content exceeding a predetermined capacity, the application 104 uses the browser 106 (or another application) to acquire the content from the information providing server 200. Thus, the mobile phone 100 according to the present embodiment solves the issue of troublesomeness of an operation when the application 104 whose available resources are restricted acquires predetermined content from the information providing server 200 using another application such as the browser 106. Therefore, the description herein focuses on processing of acquisition of predetermined content from the information providing server 200 by the application 104 using the browser 106. Needless to say, however, the application 104 can acquire low-capacity content by directly accessing the information providing server 200.

The browser 106 is one of applications to peruse predetermined Web content. For example, the browser 106 can acquire Web content corresponding to the predetermined URL specified by the user from the information providing server 200 to cause the display unit to display the Web content. In the present embodiment, the browser control unit 116 of the application 104 described above controls activation of the browser 106, acquisition of Web content and the like. As shown in FIG. 2, the browser 106 mainly includes a server access unit 118 and a display control unit 120. In the present application, the browser 106 functions as a second application not allowed to access the IC chip 102.

The server access unit 118 transmits a signal requesting predetermined Web content to the information providing server 200 in accordance with instructions from the user. The user can provide instructions to acquire Web content corresponding to a URL to the browser 106, for example, by selecting the URL displayed by the browser 106.

In addition to a request signal of Web content, the server access unit 118 transmits the user ID, current time, and signature data transferred from the application 104 to the information providing server 200. As described above, the browser 106 is not allowed to directly access the IC chip 102. However, the browser 106 can use the user ID, which is secure information recorded in the IC chip 102, as authentication information by going through the IC chip reading unit 110 of the application 104.

The server access unit 118 can also receive predetermined Web content transmitted from the information providing server 200 and transfer the Web content to the display control unit 120.

The display control unit 120 causes the display unit to display Web content acquired from the information providing server 200. As described above, Web content acquired from the information providing server 200 is transferred from the server access unit 118 to the display control unit 120. After receiving the Web content, the display control unit 120 can cause the display unit to display the Web content. If the URL corresponding to predetermined Web content is transferred from the browser control unit 116 of the application 104, the display control unit 120 can also cause the display unit to display the URL. The user can thereby select the URL displayed in the display unit.

In the foregoing, the function configuration of the mobile phone 100 according to the present embodiment has been described, but the function configuration shown in FIG. 2 is only an example to describe a characteristic portion of the present embodiment and functions provided with the mobile phone 100 are not limited to the above function. For example, the mobile phone 100 can naturally have any application other than that shown in FIG. 2 and various functions provided with general mobile phones such as the communication function and imaging function. Details of the flow of processing in which the browser 106 requests acquisition of Web content from the information providing server 200 with the above configuration will be described in a processing flow described later.

(2-2. Function Configuration of the Information Providing Server 200)

Next, the function configuration of the information providing server 200 will be described. As shown in FIG. 2, the information providing server 200 mainly includes a time counter 202, the access history management unit 204, a storage unit 206, and an authentication processing unit 210. Each function unit constituting the information providing server 200 will be described below.

The time counter 202 stores the current time. The time counter 202 can, for example, adjust the current time in accordance with an operation by the administrator of the information providing server 200 or automatically collect the current time at intervals of a predetermined time. The current time stored in the time counter 202 is used for authentication processing by the authentication processing unit 210 described later.

The access history management unit 204 manages information about an access history from the mobile phone 100 as an access history table. When an access request is sent from the browser 106 of the mobile phone 100, as described above, information of the user ID and current time is transmitted as authentication information. Therefore, the access history management unit 204 manages information including at least the user ID and current time as information about an access history.

FIG. 3 is an explanatory view exemplifying the access history table 218 managed by the access history management unit 204. As shown in FIG. 3, the access history table 218 includes at least information about the user ID and current time. The user ID is, as described above, unique identification information recorded in the IC chip 102 provided with the mobile phone 100. When an access request comes from a mobile phone corresponding to a new user ID, the access history management unit 204 can newly add the user ID and the current time at which the access request is received to the access history table 218. When an access request comes from a mobile phone corresponding to a user ID recorded in the access history table 218, the access history management unit 204 can update information about the current time corresponding to the user ID to the current time at which the new access request is received.

In this manner, the information providing server 200 can recognize when the mobile phone corresponding to each user ID accessed the information providing server 200 lastly based on the access history table 218 managed by the access history management unit 204. The access history table 218 managed by the access history management unit 204 is also used for authentication processing of an acquisition request of Web content from the browser 106 of the mobile phone 100 by the authentication processing unit 210 described later.

The storage unit 206 stores various kinds of content data managed by the information providing server 200, the above access history table, setting information and the like. The information providing server 200 can transmit predetermined content data recorded in the storage unit 206 in response to a request from the mobile phone 100, perform predetermined processing based on predetermined setting information recorded in the storage unit 206 and the like. In the present embodiment, the storage unit 206 is used to record predetermined information managed by the information providing server 200 and the type and capacity of recorded information and the recording method are not particularly limited.

The authentication processing unit 210 performs authentication processing to determine whether or not to permit access from the browser 106 in response to an acquisition request of Web content from the browser 106. As shown in FIG. 2, the authentication processing unit 210 mainly includes the signature authentication processing unit 212, the double access authentication processing unit 214, and the validity term authentication processing unit 216.

The signature authentication processing unit 212 determines whether authentication information including the user ID, current time, and signature data transmitted from the browser 106 has been falsified by third parties. More specifically, the signature authentication processing unit 212 generates signature data for the user ID and current time transmitted from the browser 106 using a predetermined encryption key. As described above, the mobile phone 100 and the information providing server 200 have a signature key as a common encryption key. Therefore, the signature authentication processing unit 212 performs encryption processing on the user ID and current time received from the browser 106 by using the signature key to generate signature data.

Here, as described above, the signature data received from the browser 106 is signature data generated by the signature data generation unit 114 for the user ID recorded in the IC chip 102 and the current time read from the time counter 108 using a signature key. Therefore, the signature data generated for the same user ID and current time by the signature authentication processing unit 212 using the signature key as a common encryption key should match the signature data transmitted from the browser 106. Thus, the signature authentication processing unit 212 compares the generated signature data and the signature data received from the browser 106. If both pieces of signature data match, the signature authentication processing unit 212 can determine that the user ID and current time have not been illegally rewritten. If, on the other hand, both pieces of signature data do not match, the signature authentication processing unit 212 determines the user ID or current time may have been rewritten and can reject access from the browser 106.

Thus, the information providing server 200 and the mobile phone 100 have a signature key as a common encryption key and therefore, it is difficult for third parties using a mobile phone that does not have the signature key to forge signature data. If, for example, the user ID or current time is illegally falsified, the signature data generated by the signature authentication processing unit 212 of the information providing server 200 will not match the signature data transmitted from the browser 106. Therefore, the signature authentication processing unit 212 can reliably reject access using authentication information falsified by third parties. The flow of concrete processing by the signature authentication processing unit 212 will be described in the processing flow described later.

The double access authentication processing unit 214 determines whether authentication information including the user ID, current time, and signature data transmitted from the browser 106 is reused by third parties. More specifically, the double access authentication processing unit 214 determines whether authentication information is reused by third parties based on the user ID and current time transmitted from the browser 106 and the access history table 218 managed by the access history management unit 204 described above.

The double access authentication processing unit 214 can recognize the date/time at which the mobile phone 100 having the user ID transmitted from the browser 106 accessed the information providing server 200 last time by referencing the access history table 218. Therefore, if, for example, a user ID transmitted from the browser 106 is not recorded in the access history table 218, the double access authentication processing unit 214 can determine that the mobile phone having the user ID accesses for the first time. The double access authentication processing unit 214 can also determine that, if, for example, the current time transmitted from the browser 106 is older than that recorded in the access history table 218, third parties have illegally reused previous access information. In this case, the double access authentication processing unit 214 can reject access from the browser 106.

Thus, the double access authentication processing unit 214 can prevent reuse of access information by third parties by comparing authentication information of the user ID and current time transmitted from the browser 106 and the access history table 218. The flow of concrete processing by the double access authentication processing unit 214 will be described in the processing flow described later.

The validity term authentication processing unit 216 determines whether authentication information including the user ID, current time, and signature data transmitted from the browser 106 is data older than a predetermined period. More specifically, the validity term authentication processing unit 216 determines whether authentication information is data older than a predetermined period based on the current time transmitted from the browser 106 and that stored in the time counter 202 described above.

The validity term authentication processing unit 216 determines whether the current time transmitted from the browser 106 is within a predetermined period, for example, by comparing with the current time in the time counter 202. The validity term authentication processing unit 216 can set the predetermined period as a signature validity term in advance and record the signature validity term in the storage unit 206. The signature validity term can arbitrarily be set, for example, by the administrator of the information providing server 200. It is desirable to set the signature validity term to a time period of a predetermined time prior to and subsequent to the current time of the time counter 202 in consideration of an error between the time counter 202 provided with the information providing server 200 and the time counter 108 provided with the mobile phone 100, communication performance of the mobile phone 100 and the like.

If, for example, the signature validity term is ±10 min and if the current time transmitted from the browser 106 is within the range of ±10 min of the current time of the time counter 202, the validity term authentication processing unit 216 can determine that the authentication information is not old data. Conversely, if the current time transmitted from the browser 106 is not within the range of ±10 min of the current time of the time counter 202, the validity term authentication processing unit 216 can determine that third parties may be using old authentication information illegally. In this case, the validity term authentication processing unit 216 can reject access from the browser 106.

Thus, the validity term authentication processing unit 216 can prevent access using old access information by comparing the current time transmitted from the browser 106, that of the time counter 202, and the preset signature validity term. The flow of concrete processing by the validity term authentication processing unit 216 will be described in the processing flow described later.

In the foregoing, the function configuration of the information providing server 200 according to the present embodiment has been described, but the function configuration shown in FIG. 2 is only an example to describe a characteristic portion of the present embodiment and functions provided with the information providing server 200 are not limited to the above function.

(3. Flow of Access Processing by the Mobile Phone 100)

Figure 4:
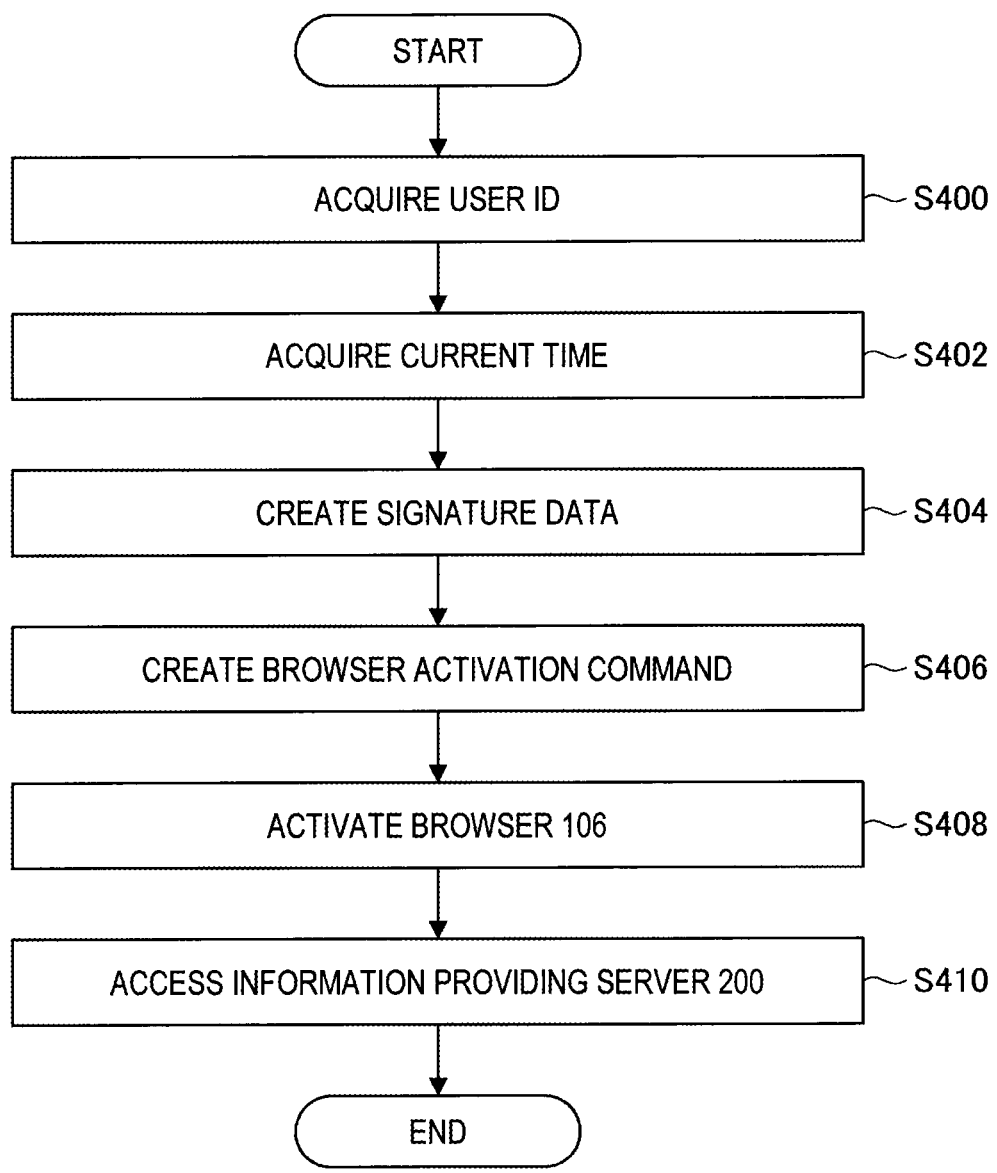
FIG. 4 is a flow chart showing a flow of processing by the mobile phone 100 according to the present embodiment to acquire the predetermined Web content from the information providing server 200 via the browser 106.

Next, the flow of processing to request acquisition of predetermined Web content by the mobile phone 100 from the information providing server 200 via the browser 106 will be described. FIG. 4 is a flow chart showing the flow of processing by the mobile phone 100 to request acquisition of predetermined Web content from the information providing server 200 via the browser 106. The mobile phone 100 performs the flow processing shown in FIG. 4, for example, in accordance with acquisition request instructions of Web content by the user.

First, at step 400, the application 104 reads the user ID recorded in the IC chip 102. The user ID is read by the IC chip reading unit 110 described above. Then, the user ID read by the IC chip reading unit 110 is transferred to the signature data generation unit 114 to generate signature data.

Next, at step 402, the application 104 reads the current time from the time counter 108. The current time is read by the current time reading unit 112 described above. Then, the current time read by the current time reading unit 112 is transferred to the signature data generation unit 114 to generate signature data.

Next, at step 404, the application 104 generates signature data based on the user ID read at step 400 and the current time read at step 402. The signature data is generated by the signature data generation unit 114. As described above, the mobile phone 100 and the information providing server 200 have a signature key as a common encryption key. Therefore, the signature data generation unit 114 performs encryption processing on the user ID and current time received using the signature key to generate signature data.

As long as an encryption method using a signature key is common to the mobile phone 100 and the information providing server 200, the encryption method is not limited to a specific one.

Next, at step 406, the signature data generation unit 114 generates a browser activation command including the access destination URL, user ID, current time, and generated signature data. Then, at step 408, the generated browser activation command is transferred to the browser 106 to activate the browser 106.

After being activated, at step 410, the browser 106 accesses the information providing server 200 specified by the URL. At this point, the browser 106 transmits the user ID, current time, and signature data transferred from the application 104 to the information providing server 200 as authentication information. The authentication information is transmitted by the server access unit 118.

With the above processing flow, the mobile phone 100 can request acquisition of Web content of the information providing server 200 corresponding to the predetermined URL via the browser 106. At this point, the browser 106 receives the user ID recorded in the IC chip 102 from the application 104 and transmits the user ID to the information providing server 200 as authentication information. That is, the browser 106 can obtain secure information recorded in the IC chip 102 allowed to be accessed only by specific applications via the application 104 and transmit the secure information to the information providing server 200 as authentication information. As a result, when Web content whose release is restricted is acquired from the information providing server 200 by using the browser 106, there is no need for the user to perform a troublesome operation of entering a password or subscriber information of communication carriers.

Figure 5:
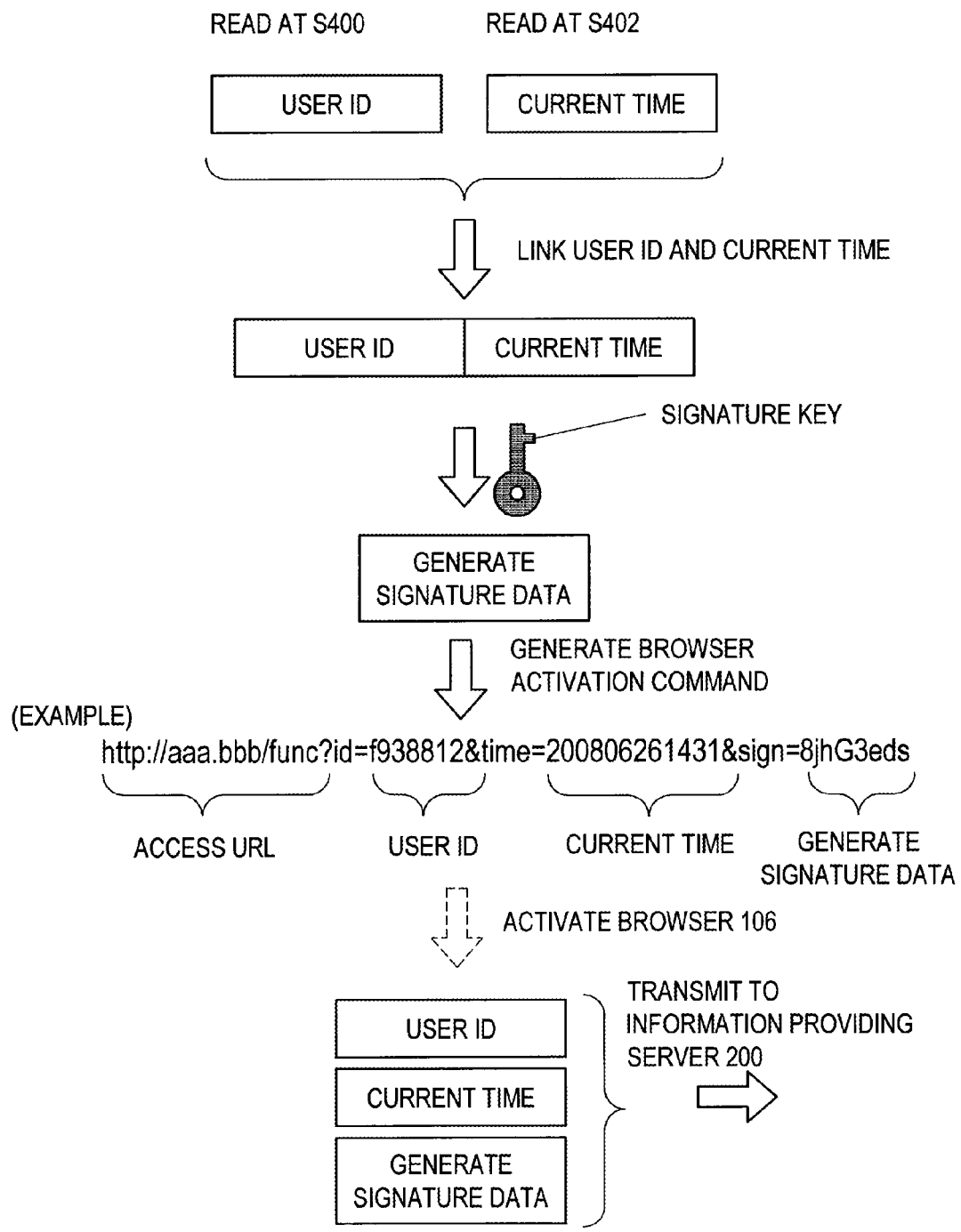
FIG. 5 is an explanatory view showing the concept before authentication information being transmitted from the browser 106 to the information providing server 200 according to the processing flow in FIG. 4.

FIG. 5 is an explanatory view showing the concept before authentication information being transmitted from the browser 106 to the information providing server 200 according to the processing flow shown above.

Referring to FIG. 5, after the user ID read at step 400 and the current time read at step 402 being linked, signature data is generated using a signature key. A browser activation command containing the access destination URL, user ID, current time, and signature data is generated like an example in FIG. 5 and transferred to the browser 106 to activate the browser 106. Subsequently, it is evident that the browser 106 transmits the user ID, current time, signature data to the information providing server 200 as authentication information.

(4. Flow of Access Authentication Processing by the Information Providing Server 200)

Figure 6:
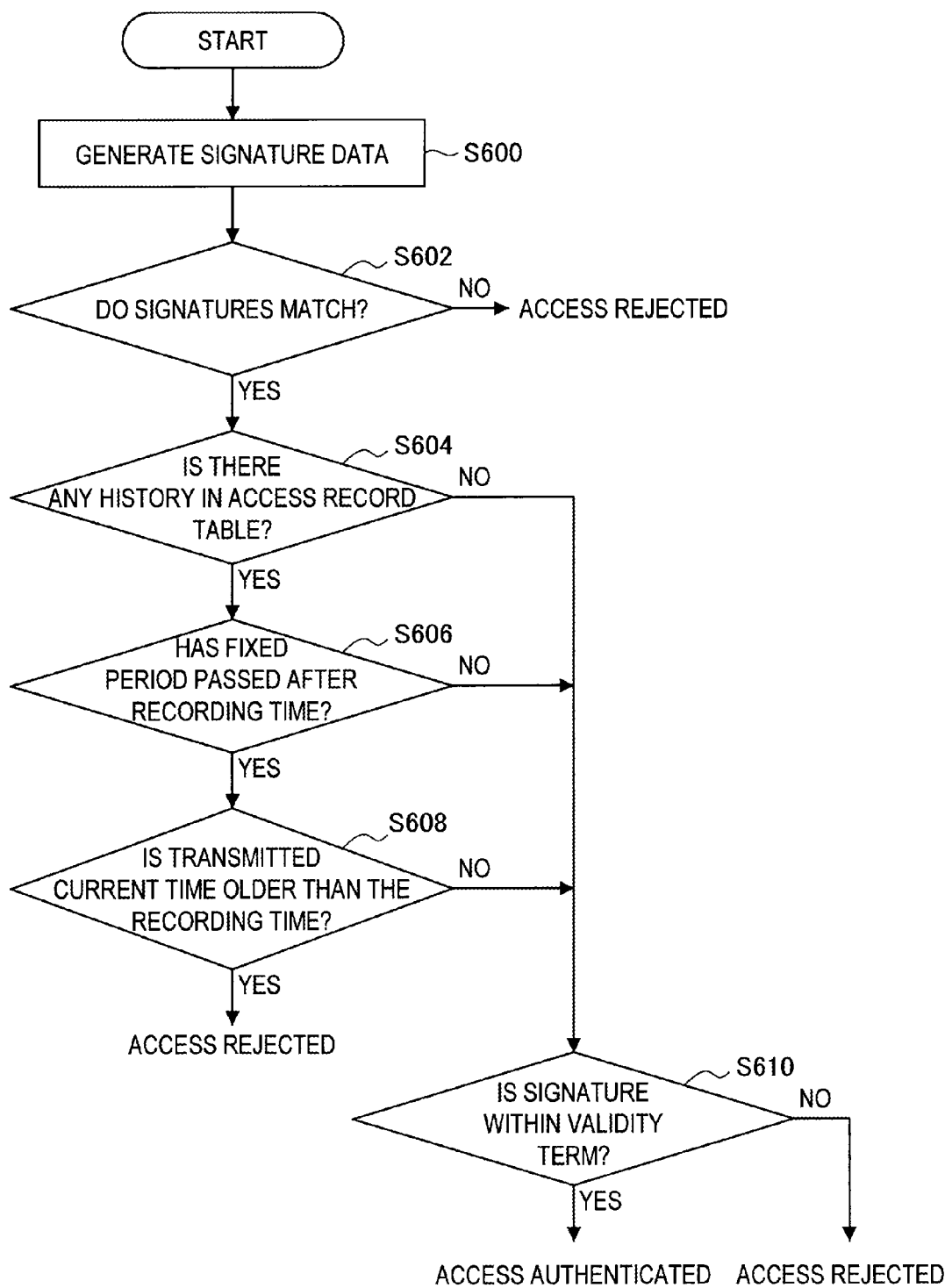
FIG. 6 is a flow chart showing the flow of authentication processing performed by the information providing server 200 according to the present embodiment.

Next, the flow of authentication processing performed by the information providing server 200 to an access request from the mobile phone 100 will be described. FIG. 6 is a flow chart showing the flow of authentication processing performed by the information providing server 200.

In the information providing server 200, as described above, the signature authentication processing unit 212, the double access authentication processing unit 214, and the validity term authentication processing unit 216 constituting the authentication processing unit 210 perform authentication processing on an access request transmitted from the browser 106. More specifically, the signature authentication processing unit 212 determines whether authentication information transmitted from the browser 106 is falsified. The double access authentication processing unit 214 determines whether authentication information transmitted from the browser 106 is reused by third parties. Further, the validity term authentication processing unit 216 determines whether authentication information transmitted from the browser 106 is generated within a predetermined valid period. If the access request from the browser 106 is authenticated based on these authentication results, the requested Web content is transmitted to the browser 106 and, if the access request is not authenticated, access from the browser 106 is rejected.

First, as shown in FIG. 6, at step 600, the signature authentication processing unit 212 generates signature data for the user ID and current time transmitted from the browser 106. As described above, the mobile phone 100 and the information providing server 200 have a signature key as a common encryption key. Therefore, the signature authentication processing unit 212 performs encryption processing on the user ID and current time received from the browser 106 using the signature key to generate signature data.

Next, at step 602, the signature authentication processing unit 212 compares the generated signature data and the signature data transmitted from the browser 106. The signature authentication processing unit 212 has generated the signature data using a signature key common to that used by the application 104 of the mobile phone 100 for generating authentication data. Therefore, if signature data is generated for the user ID and current time used when the signature data is generated by the application 104 of the mobile phone 10 using the common signature key, the same signature data as that generated by the application 104 should be generated.

Figure 7:
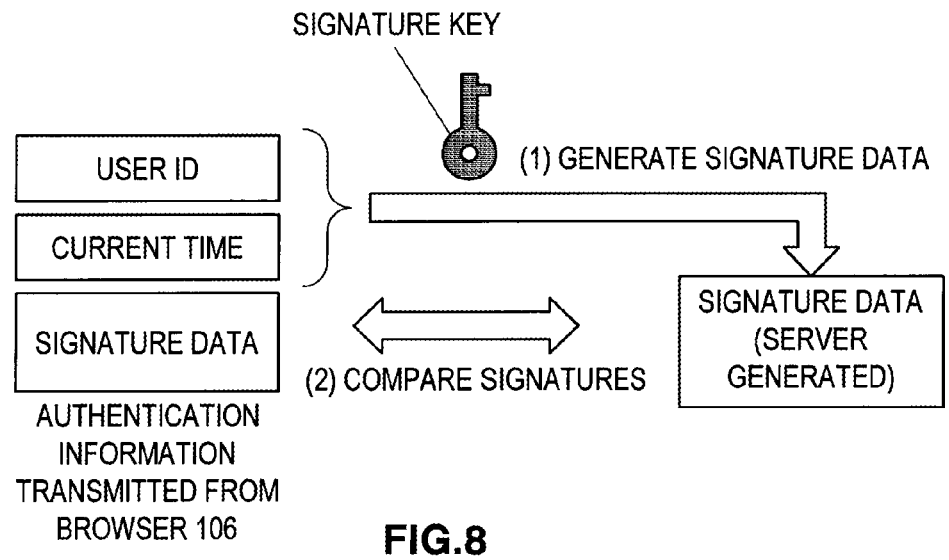
FIG. 7 is an explanatory view showing the concept of authentication processing of signature data performed by a signature authentication processing unit 212 in the present embodiment.

FIG. 7 is an explanatory view showing the concept of authentication processing of signature data performed by the signature authentication processing unit 212. As shown in FIG. 7, the signature authentication processing unit 212 generates signature data from the user ID and current time transmitted from the browser 106 using the signature key. Then, the generated authentication information and the authentication information transmitted from the browser 106 are compared.

If the generated signature data is not the same as the signature data transmitted from the browser 106, the signature authentication processing unit 212 determines that the user ID or current time transmitted from the browser 106 may be falsified. In this case, the signature authentication processing unit 212 rejects access from the browser 106. At this point, the information providing server 200 may transmit a message of access rejection or a message of requesting retransmission of authentication information to the browser 106.

If, on the other hand, the generated signature data is the same as the signature data transmitted from the browser 106, the signature authentication processing unit 212 determines that the user ID or current time transmitted from the browser 106 is not falsified. In this case, double access authentication processing and validity term authentication processing described later will be performed.

Referring to FIG. 6 again, at step 604, the double access authentication processing unit 214 determines whether the user ID transmitted from the browser 106 is recorded in the access history table 218 managed by the access history management unit 204. As described above, the access history table 218 has information about the current time when the information providing server 200 was accessed last time for each user ID recorded therein. Therefore, if a user ID transmitted from the browser 106 is not recorded in the access history table 218, the mobile phone 100 having the user ID can be determined to have accessed the information providing server 200 for the first time. In this case, there is no possibility of the user ID being reused by third parties and thus, the double access authentication processing terminates to continue validity term authentication processing at step 610.

If, on the other hand, the user ID transmitted from the browser 106 is recorded in the access history table 218, double access authentication processing at steps 606 and 608 will be performed.

At step 606, the double access authentication processing unit 214 determines whether the current time recorded in the access history table 218 is within a preset period when compared with the current time of the time counter 202. At this step, the information providing server 200 can set a period to be a decision criterion in advance as a session validity term and record the session validity term in the storage unit 206. The session validity term can arbitrarily be set and changed, for example, by the administrator of the information providing server 200 and is not limited to a specific number.

If it is determined at step 606 that the current time recorded in the access history table 218 is not within the session validity term when compared with the current time of the time counter 202, validity term processing at step 610 is performed. On the other hand, if it is determined at step 606 that the current time recorded in the access history table 218 is within the session validity term when compared with the current time of the time counter 202, double access authentication processing will subsequently be performed at step 608.

The double access authentication processing unit 214 performs processing at step 606 to prevent a harmful case that if the current time transmitted from the mobile phone 100 is erroneously a far future time and then, the current time of the mobile phone 100 is corrected, the information providing server 200 will not be accessible again.

Next, at step 608, the double access authentication processing unit 214 determines whether the current time transmitted from the browser 106 is older than that recorded in the access history table 218. If it is determined that the current time transmitted from the browser 106 is not older than that recorded in the access history table 218, the double access authentication processing terminates to continue validity term authentication processing at step 610.

On the other hand, if it is determined that the current time transmitted from the browser 106 is older than that recorded in the access history table 218, the double access authentication processing unit 214 determines that previous access information may illegally have been reused by third parties. At this point, the information providing server 200 may transmit a message of access rejection or a message of requesting retransmission of authentication information to the browser 106.

Figure 8:
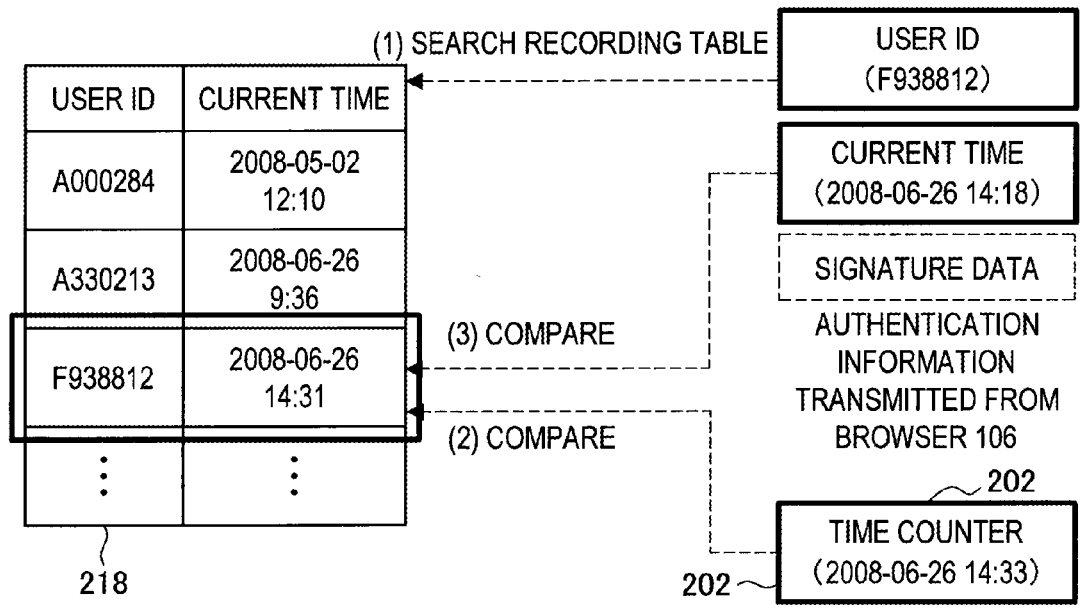
FIG. 8 is an explanatory view showing the concept of double access authentication processing performed by a double access authentication processing unit 214 in the present embodiment.

FIG. 8 is an explanatory view showing the concept of double access authentication processing performed by the double access authentication processing unit 214. As shown in FIG. 8, an access history of the user ID (F938812) transmitted from the browser 106 is retrieved from the access history table 218. Then, the current time recorded in the retrieved access history and that of the time counter 202 are compared to determine whether the current time recorded in the access history is older than a preset session validity term. Then, whether the current time transmitted from the browser 106 is older than that recorded in the retrieved access history is determined. In the example shown in FIG. 8, the current time transmitted from the browser 106 is 2008-06-26 14:18 and the current time recorded in the retrieved access history is 2008-06-26 14:31. Thus, the current time transmitted from the browser 106 is older than that recorded in the access history and thus, the double access authentication processing unit 214 determines that previous authentication information may illegally have been reused by third parties and rejects access from the browser 106.

Referring to FIG. 6 again, at step 610, the validity term authentication processing unit 216 compares the current time transmitted from the browser 106 and that of the time counter 202 to determine whether the difference thereof is within a preset period. As described above, the validity term authentication processing unit 216 can set the predetermined period as a signature validity term and record the signature validity term in the storage unit 206.

Figure 9:
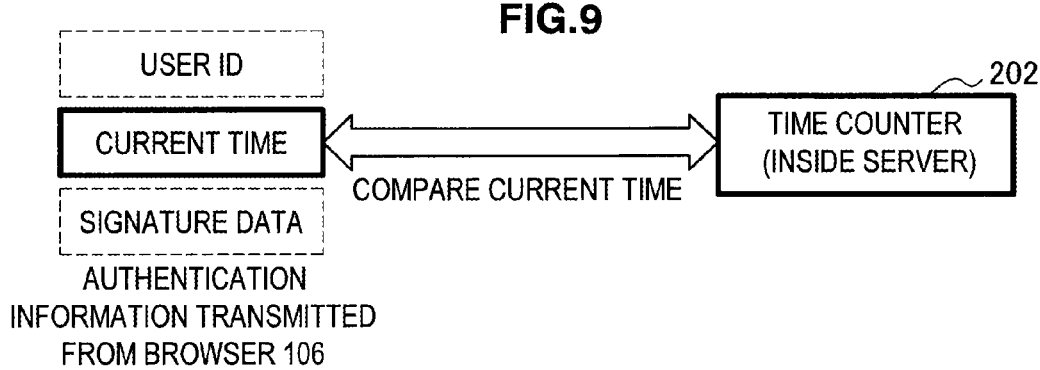
FIG. 9 is an explanatory view showing the concept of validity term authentication processing performed by a validity term authentication processing unit 216 in the present embodiment.

FIG. 9 is an explanatory view showing the concept of validity term authentication processing performed by the validity term authentication processing unit 216. As shown in FIG. 9, the current time contained in authentication information transmitted from the browser 106 and that of the time counter 202 are compared. The validity term authentication processing unit 216 determines whether the difference of the two current times is within the preset signature validity term.

If the current time transmitted from the browser 106 and that of the time counter 202 are compared and it is determined that the difference thereof is not within the signature validity term, the validity term authentication processing unit 216 determines that third parties may be using old authentication information. In this case, the validity term authentication processing unit 216 rejects access from the browser 106. At this point, the information providing server 200 may transmit a message of access rejection or a message of requesting retransmission of authentication information to the browser 106.

If, on the other hand, the current time transmitted from the browser 106 and that of the time counter 202 are compared and it is determined that the difference thereof is within the signature validity term, the information providing server 200 authenticates access from the browser 106 and instructs the access history management unit 204 to update the access history. If an access request corresponding to the user ID transmitted from the browser 106 is recorded in the access history table 218, the access history management unit 204 updates the current time of the record to that transmitted from the browser 106. If the user ID is not recorded n the access history table 218, the access history management unit 204 newly adds the user ID and the current time to the access history table 218. In this case, the information providing server 200 transmits Web content requested by the browser 106 to the mobile phone 100. Accordingly, the browser 106 of the mobile phone 100 can have the Web content transmitted from the information providing server 200 displayed.

Thus, the authentication processing unit 210 of the information providing server 200 can determine whether to permit access from the browser 106 by performing authentication processing of signature data, that of double access, and that of the signature validity term. Authentication information transmitted from the browser 106 includes the user ID, which is secure information recorded in the IC chip 102, and signature data generated based on the user ID. Therefore, there is no need for the information providing server 200 to manage a list of IDs other than user IDs or passwords. An access request can be authenticated based on the user ID recorded in the IC chip 102 even if the access request comes from a mobile phone of a different communication carrier. As a result, there is no need for the information providing server 200 to manage IDs other than user IDs recorded in the IC chip 102, passwords or subscriber information of communication carriers or to manage a complex operation such as performing different authentication processing for each communication carrier.

(5. Hardware Configuration of the Mobile Phone 100)

Figure 10:
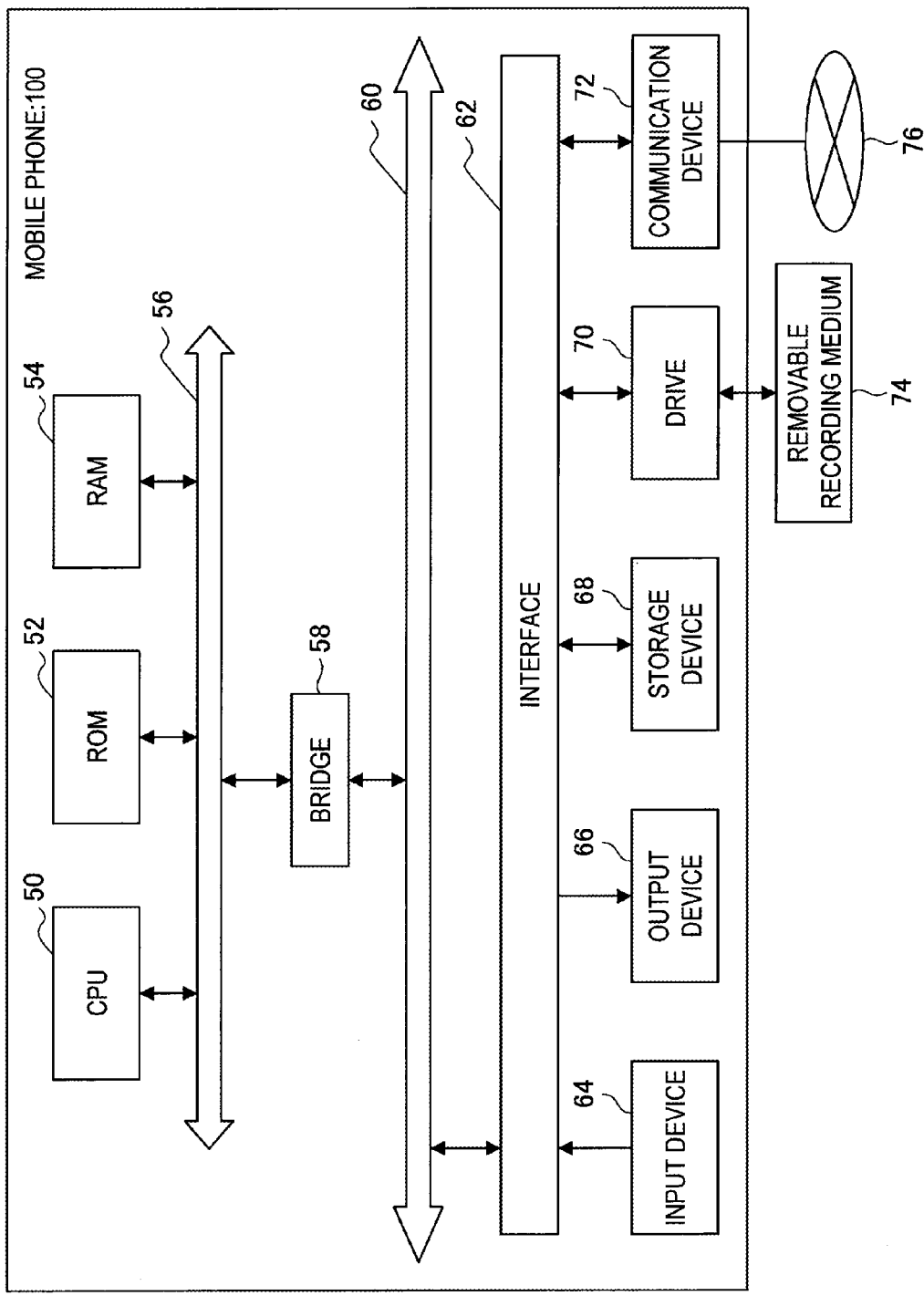
FIG. 10 is a block diagram illustrating a hardware configuration of the mobile phone 100 according to the present embodiment.

Next, the hardware configuration of the mobile phone 100 according to an embodiment will be described in detail with reference to FIG. 10. FIG. 10 is a block diagram illustrating the hardware configuration of the mobile phone 100 according to an embodiment.

The mobile phone 100 includes a CPU (Central Processing Unit) 50, a ROM (Read Only Memory) 52, a RAM (Random Access Memory) 54, a host bus 56, a bridge 58, an external bus 60, an interface 62, an input device 64, an output device 66, a storage device (HDD) 68, a drive 70, and a communication device 72.

The CPU 50 functions as an arithmetic processing unit and a control unit and controls overall operations in the mobile phone 100 according to various programs. The CPU 50 may be a microprocessor. The ROM 52 stores programs, arithmetic parameters and the like used by the CPU 50. The RAM 54 temporarily stores programs used for execution of the CPU 50 and parameters that appropriately change during execution thereof. These components are mutually connected by the host bus 56 constituted by a CPU bus or the like.

The host bus 56 is connected to the external bus 60 such as PCI (Peripheral Component Interconnect/Interface) bus via the bridge 58. Incidentally, the host bus 56, the bridge 58, and the external bus 60 do not necessarily have to be constituted as separate components and these functions may be implemented in one bus.

The input device 64 includes, for example, an input means for inputting information by the user such as a pointer, keyboard, touch panel, button, microphone, switch, and lever and an input control circuit that generates an input signal based on input by the user and outputs the input signal to the CPU 50. The user of the mobile phone 100 can input various kinds of data into the mobile phone 100 or instruct processing operations by operating the input device 64.

The output device 66 includes, for example, a display device such as a liquid crystal display device, EL display device, and lamp and a sound output a device such as a speaker and headphone. The output device 66 outputs, for example, reproduced content. More specifically, the display device displays various kinds of information such as reproduced video data as text or images. The sound output device, on the other hand, outputs reproduced sound data after conversion into sound.

The storage device 68 is a device for data storage constituted as an example of the storage unit of the mobile phone 100 according to the present embodiment and is constituted, for example, by a non-volatile semiconductor memory. The storage device 68 drives the non-volatile semiconductor memory to store programs executed by the CPU 50 and various kinds of data.

The drive 70 is a reader writer for recording media and is added to the mobile phone 100 internally or externally. The drive 70 reads information recorded in an inserted removable recording medium 74 such as a magnetic disk, optical disk, magneto-optical disk, and semiconductor memory and outputs the information to the RAM 54.

The communication device 72 is a communication interface constituted, for example, by a communication device to connect to a communication network 76 and the like. The communication device 72 may be a carrier communication network compliant communication device, a radio LAN (Local Area Network) compliant communication device, or a wire communication device that performs communication by wire. The communication device 72 transmits/receives various kinds of data such as a request signal of Web content and authentication information to/from the information providing server 200 via the communication network 76.

In the foregoing, an example of the hardware configuration capable of realizing the function of the mobile phone 100 in the present embodiment has been shown. Each of the above components may be constituted by using general-purpose members or hardware tailored for the function of each component. Therefore, the hardware configuration to be used can be appropriately changed in accordance with the technological level when the present embodiment is carried out. A hardware configuration substantially the same as that for the mobile phone 100 can be adopted for the information providing server 200 and thus, a detailed description thereof is omitted.

In the above embodiment, for example, the mobile phone 100 in which the IC chip 102 is mounted has been described as an example of the information processing apparatus, but the present application is not limited to such an example. The information processing apparatus according to an embodiment may be, for example, an information processing apparatus such as PDA (Personal Digital Assistants) and mobile music layer in which the IC chip 102 is mounted.

Steps described in a flow chart herein includes not only processing performed chronologically in the order described, but also processing that is not necessarily performed chronologically and is performed in parallel or individually. Needless to say, the order of steps processed chronologically may be appropriately changed. For example, the above authentication processing performed by the information providing server 200 does not have to be necessarily performed in the order described above. For example, signature data authentication processing, double access authentication processing, and validity term authentication processing may be performed by changing the order thereof, only a portion of authentication processing may be performed, or further other authentication processing may additionally be performed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A mobile device, comprising:
a secure storage device in which authentication data is securely recorded,
a first software capable of accessing the secure storage device and restricted from acquiring content exceeding a predetermined capacity from an information providing sever, the first software including a reading unit that reads the authentication data recorded in the secure storage device; and
a second software which is not capable of accessing the secure storage device and is capable of acquiring content exceeding the predetermined capacity from the information providing server, the second software including a server access unit that requests acquisition of content from the information providing server by using the authentication data read by the reading unit from the secure storage device and the server access unit is configured to receive the authentication data from the first software, wherein the information providing server, which is outside the mobile device, is configured to perform authentication processing to provide the content requested by the second software to the mobile device and the second software is configured to transmit the authentication data to the information providing server.

2. The mobile device according to claim 1, wherein a user ID specific to the secure storage device is recorded in the secure storage device; and
the reading unit reads the user ID from the secure storage device.

3. The mobile device according to claim 2, further comprising a time counter that stores a current time, wherein the first software further includes a current time reading unit that reads the current time recorded in the time counter; and
a signature data generation unit that generates signature data by performing encryption processing on the user ID read by the reading unit and the current time read by the current time reading unit.

4. The mobile device according to claim 3, further comprising an encryption key common to the information providing server, wherein
the signature data generation unit generates signature data by performing encryption processing on the user ID read by the reading unit and the current time read by the current time reading unit using the encryption key.

5. The mobile device according to claim 4, wherein the first software further includes an activation control unit that activates the second software by transferring the user ID read by the reading unit, the current time read by the current time reading unit, and the signature data generated by the signature data generation unit to the second software.

6. The mobile device according to claim 5, wherein when the server access unit requests the acquisition of the content from the information providing server that provides predetermined content, the server access unit further transfers the current time transferred from the activation control unit to the information providing server, in addition to the signature data and the user ID.

7. The mobile device according to claim 1, wherein the first software is configured to perform an encryption process using a signature key, and wherein the encryption key is common to the information providing server.

8. The mobile device according to claim 1, wherein the secure storage device is configured to communicate with the reading unit in a non-contact manner.

9. The mobile device according to claim 1, wherein the first software is configured to acquire content below the predetermined capacity from the information providing server.

10. An information processing method performed on a mobile device comprising the steps of:
reading authentication data recorded in the mobile device in a secure storage device by a reading unit of a first software capable of accessing the secure storage device in which the authentication data is securely recorded and restricted from acquiring content exceeding a predetermined capacity from an information providing sever; and
requesting acquisition of content from the information providing server by a server access unit of a second software, which is not capable of accessing the secure storage device and is capable of acquiring content exceeding the predetermined capacity from the information providing server, using the authentication data read by the reading unit from the secure storage device, wherein the information providing server, which is outside the mobile device, is configured to perform authentication processing to provide the content requested by the second software to the mobile device, wherein the server access unit is configured to receive the authentication data from the first software, and wherein the second software is configured to transmit the authentication data to the information providing server.

11. A non-transitory computer readable medium storing an information processing program, which when executed on a mobile device, causes the mobile device to perform:
secure storage device reading processing to read authentication data recorded in the mobile device in a secure storage device by a reading unit of a first software capable of accessing the secure storage device in which the authentication data is securely recorded and restricted from acquiring content exceeding a predetermined capacity from an information providing sever; and content request processing to request acquisition of content from the information providing server by a server access unit of a second software, which is not capable of accessing the secure storage device and is capable of acquiring content exceeding the predetermined capacity from the information providing server, using the authentication data read by the reading unit from the secure storage device, wherein the information providing server, which is outside the mobile device, is configured to perform authentication processing to provide the content requested by the second software to the mobile device, wherein the server access unit is configured to receive the authentication data from the first software, and wherein the second software is configured to transmit the authentication data to the information providing server.

12. An information processing system, comprising:

a mobile device, including:

a secure storage device in which authentication data is securely recorded, a first software capable of accessing the secure storage device and restricted from acquiring content exceeding a predetermined capacity from an information providing sever, the first software including a reading unit that reads the authentication data recorded in the secure storage device; and a second software which is not capable of accessing the secure storage device and is capable of acquiring content exceeding the predetermined capacity from the information providing server, the second software including a server access unit that requests acquisition content from the information providing server by using the authentication data read by the reading unit from the secure storage device and the server access unit is configured to receive the authentication data from the first software, wherein the information providing server, which is outside the mobile device, is configured to perform authentication processing to provide the content requested by the second software to the mobile device and the second software configured to transmit the authentication data to the information providing server; and the information providing server, including:

an authentication processing unit that determines whether the request of the acquisition of the content from the second software is authorized based on the authentication data transmitted from the second software, wherein if the request of the acquisition of the content from the second software is determined to be authorized, the content requested by the second software is transmitted to the second software.

* * * * *